UNITED STATES PATENT OFFICE.

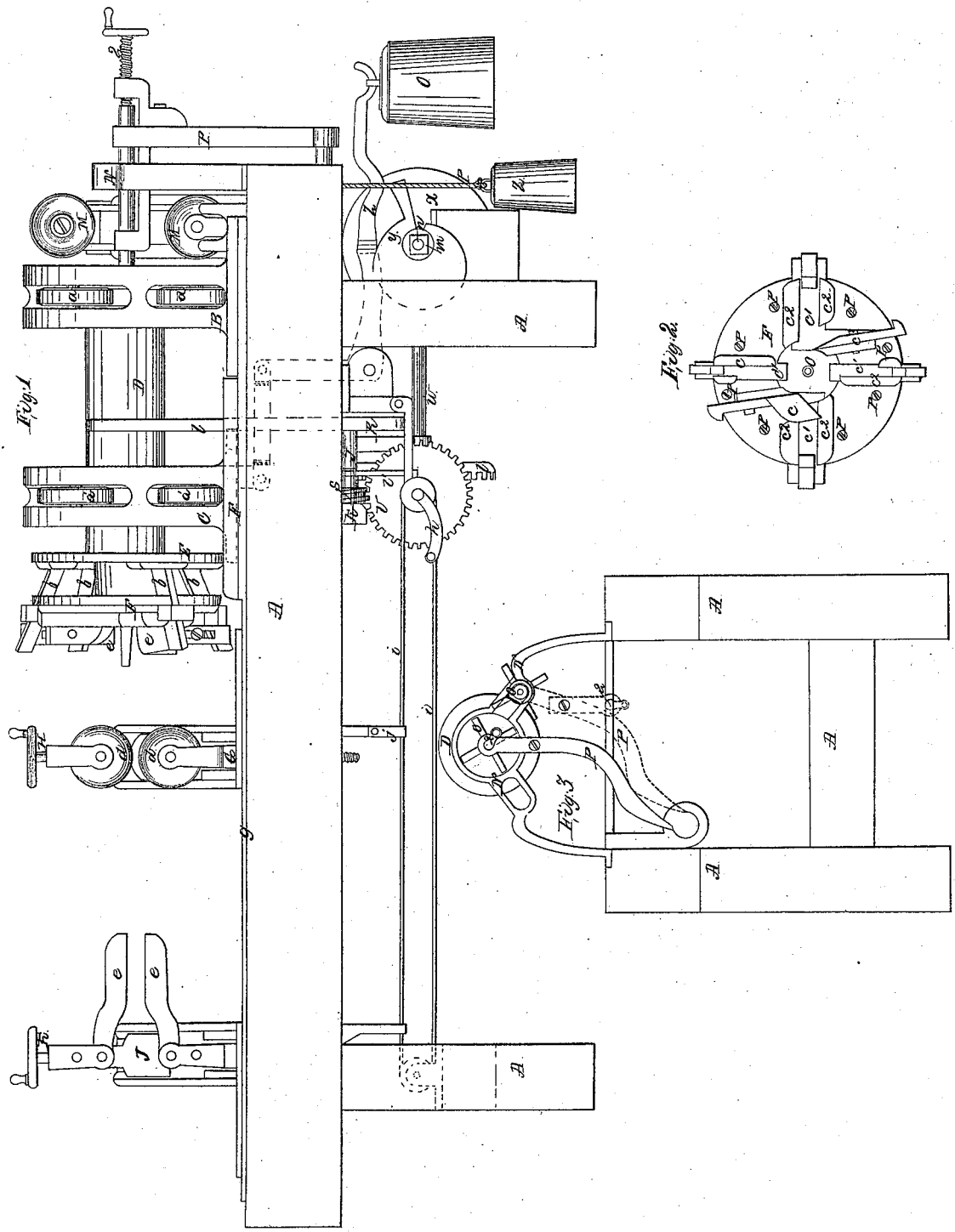
H. E. Salisbury,
Gage Lathe.
Nº 15,196.
Patented June 24, 1856.

H. E. SALISBURY, OF PLATEA, PENNSYLVANIA.

METHOD OF TURNING TAPERING FORMS.

Specification of Letters Patent No. 15,196, dated June 24, 1856.

*To all whom it may concern:*

Be it known that I, H. E. SALISBURY, of Platea, in the county of Erie and State of Pennsylvania, have invented a new and useful Improvement in Machines for Turning Tapering and Irregular Timbers, such as Oars, Spars, and Handspikes; and I do hereby declare that the following is a full and exact description thereof, reference being had to the accompanying drawings and to the letters of reference marked thereon, similar characters referring to like parts in the several figures.

Figure 1, is a side elevation. Fig. 2, is an end view of the cutters and face plate, Fig. 3, is an end view of the machine showing the operation of the center piece.

In the construction of my invention in Fig. 1, A, is the frame; B is the stationary frame or journal with friction rollers $a$; C the sliding journal with friction rollers $a'$; D, the mandrel; E, the face plate attached to journal C, with radiating arms $b$ for operating the cutters vertically, or closing them to the center; F, the stationary revolving face plate to which the cutters are attached; $c$, the cutters; G, the sliding rest with friction rollers $d$, for the timber to rest on; H, the right and left screw for regulating the friction rollers $d$; I, the sliding rest with clamp jaws $e$, for holding the timber while being turned; K, the right and left screw for regulating the clamp jaws; L, the feed belt; M, friction roller for supporting the end of the timber while it passes through the mandrel, and holding it in the center; N, a guard to support the center piece; O, the sliding center piece; P, the sliding guard for the center piece to rest in; Q, the screw for tightening the center piece, and holding it in place; $f$, the grooved guards; $g$ the rail for the rest to slide on; R, pulley; $s$, worm screw on the same shaft; T, the shaft; U, the gear wheel; $h$, the crank; $i$, the belt; $j$, clamp for fastening to the belt; $k$ bearings for shaft T, and lever for operating the knives vertically, or to the center, and also the bearing of shaft for gear wheel U; V, bevel gear wheel on shaft W, with a pinion wheel on the end which works in wheel X; $l'$ catch for elevating gear wheel U, when turning; Y, the cam for giving the form; $m$, nut on the end of shaft $n$ passing through cam Y; Z, the lever operating on cam Y; $o$, weight on the end of the lever; $z$ weight attached to cord P, for closing the friction rollers M.

In Fig. 2, F, the stationary revolving face plate; $c$, the cutters; $c'$, the slides for holding the timber stationary; O, the sliding center piece; $c^2$, grooves for slides $c'$ to move in; $p$, screws for fastening the sections forming the grooves for slide $c'$ to work in.

Fig. 3, A, the frame; D, the mandrel; N, the guard to support the sliding center; Q, the screw for tightening the sliding center; P, the sliding guard. The red lines show the sliding center thrown down in order to let the timber pass out. P, is the movable guard. Q, is the screw turned down, and $o$ the sliding center.

In constructing the revolving face plate, I construct segments of a plate with projections on them, for grooves into which I fit the slides for holding them in their place; in these slides $c'$ is a slot $c^3$ through which pass radiating arms $b$; these sections of the face plate are firmly attached to the rear side of the face plate by means of screws, all of which is shown in Fig. 2.

In the operation of my invention I arrange the sliding heads in position to receive the timber to be turned. I then place the timber in, and screw tightly the clamp jaws $c$, which firmly hold it. I then set the sliding rest at the point required, and bring the friction rollers $a$, together between which the timber rests. I then place, or push the center piece against the end of the timber next the cutters, and turn the screw Q against the same to hold it in its place. Motion is now given to the machine by a belt on the mandrel which acts as a pulley, or a band pulley may be attached to it. This will revolve the cutters, and a band, or gear belt is extended from the mandrel to the pulley R on shaft T which gives motion to the same. As it revolves the worm screw operates on gear wheel U which gives motion to the endless chain belt to which sliding rest J is attached by means of clamp 1, and to which is attached the sliding center by means of clamp 2, and as the timber is fed to the cutters the sliding center is moved out. A pinion on the end of the shaft of gear wheel U, works into a gear wheel on the end of shaft W, with a pinion wheel at the other end working into bevel gear wheel V, and which revolves the shaft $n$ on which is placed cam Y, on which lever L operates.

As the irregularities of the cam operate on the lever it is raised, or depressed, and it is connected to the face plate E, by means of the levers shown in dotted lines Fig. 1, and as it raises, the face plate slides toward the cutters, causing the radiating arms $b$ to pass through slots $c^3$, thus closing the cutters, and making them to conform to the shape of the timber. When the irregularities of the cam depress the lever the face plate E, is drawn back, and the arms are drawn out of the slots, thus opening the cutters so as to conform to the unevenness of the timber. When the timber has passed through the mandrel the sliding center falls out as shown in red lines, Fig. 3, and if the timber is very long as in spars and oars the weight $z$ is allowed to press on the wheel to which it is attached which will bring the friction rollers M, to bear on it, and which will act as a rest to steady and support it.

While the machine is in operation, the gear wheel M, is held in gear by means of catch $l$ and as the slide $j$, moves up to the cutters it operates on the end of catch $l$, and displaces it allowing the gear wheel U to fall out of place. I then reverse the sliding rest J, and cam Y, by means of the crank, and handle $i$, when the machine is again ready to receive another piece of timber, and recommence the same operation.

I do not claim causing cutters to advance and recede to, and from the piece being turned irrespective of the specific arrangement.

Having thus fully described the construction and operation of my invention what I claim as new and desire to secure by Letters Patent, is:

1. The manner herein described for operating the revolving cutters namely by means of cam Y, lever L, movable face plate E with radiating arm $b$ passing through slots $c'$, with slides $d$, on revolving face plate F, for the purpose of opening and closing the cutters as described, and holding the timber stationary.

2. I also claim the movable center piece operating as described, and for the purposes set forth in combination with the feed motion as herein set forth.

H. E. SALISBURY.

Witnesses:
T. G. CLAYTON,
J. C. CLAYTON.